US012633741B2

(12) United States Patent
Takeuchi et al.

(10) Patent No.: US 12,633,741 B2
(45) Date of Patent: May 19, 2026

(54) DC POWER DISTRIBUTION SYSTEM AND CONTROL POWER GENERATION DEVICE

(71) Applicant: Mitsubishi Electric Corporation, Tokyo (JP)

(72) Inventors: Hayato Takeuchi, Tokyo (JP); Tomoyuki Kawakami, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 30 days.

(21) Appl. No.: 18/863,489

(22) PCT Filed: Jun. 3, 2022

(86) PCT No.: PCT/JP2022/022608
§ 371 (c)(1),
(2) Date: Nov. 6, 2024

(87) PCT Pub. No.: WO2023/233651
PCT Pub. Date: Dec. 7, 2023

(65) Prior Publication Data
US 2025/0300456 A1 Sep. 25, 2025

(51) Int. Cl.
*H02J 1/12* (2026.01)
*H02J 3/38* (2006.01)
(Continued)

(52) U.S. Cl.
CPC ................ *H02J 1/12* (2013.01); *H02J 3/381* (2013.01); *H02M 1/0006* (2021.05); *H02M 3/158* (2013.01); *H02J 2101/24* (2026.01)

(58) Field of Classification Search
CPC ............... H02M 1/0006; H02J 3/38–50; H02J 2101/24; H02J 2300/24
See application file for complete search history.

(56) References Cited

U.S. PATENT DOCUMENTS 6,456,508 B1* 9/2002 Namai .................... H02M 1/10
318/116
2012/0074777 A1 3/2012 Sugiyama et al.
(Continued)

FOREIGN PATENT DOCUMENTS

JP H0562193 U 8/1993
JP 2012070536 A 4/2012

OTHER PUBLICATIONS

International Search Report (PCT/ISA/210) with translation and Written Opinion (PCT/ISA/237) mailed on Aug. 16, 2022, by the Japanese Patent Office as the International Searching Authority for International Application No. PCT/JP2022/022608. (10 pages).

*Primary Examiner* — Daniel Cavallari
*Assistant Examiner* — David A Shiao
(74) *Attorney, Agent, or Firm* — BUCHANAN, INGERSOLL & ROONEY PC

(57) ABSTRACT

Voltage command values are set according to voltage fluctuations of a plurality of power supply sources, and one of outputs from a plurality of power supply circuits which output DC voltages obtained by performing conversion according to the voltage command values is supplied to a power conversion circuit as control power so that the system can be continuously operated even at the time of an abnormality due to a device failure and a power outage, and control power consumption can be suppressed in the case of voltage fluctuations of the power supply sources.

13 Claims, 11 Drawing Sheets

(51) Int. Cl.
    *H02M 1/00*        (2007.01)
    *H02M 3/158*      (2006.01)
    *H02J 101/24*       (2026.01)

(56)             References Cited

U.S. PATENT DOCUMENTS

| | | | |
|---|---|---|---|
| 2014/0077608 A1* | 3/2014 | Nosaka | H02J 1/102 |
| | | | 307/77 |
| 2018/0145518 A1* | 5/2018 | Onizuka | H02J 7/0013 |
| 2020/0290670 A1* | 9/2020 | Iida | H02M 3/1582 |
| 2021/0028503 A1* | 1/2021 | Hilligoss | H02M 3/1582 |
| 2021/0194251 A1* | 6/2021 | Moriyama | H02M 1/36 |
| 2021/0218336 A1* | 7/2021 | Shkoury | H02J 3/38 |

* cited by examiner

DC POWER DISTRIBUTION SYSTEM AND CONTROL POWER GENERATION DEVICE

TECHNICAL FIELD

The present disclosure relates to a DC power distribution system and a control power generation device.

BACKGROUND ART

Conventionally, a configuration has been known in which: a DC/DC converter is used as a power supply for controlling a voltage-type inverter; and input power for the DC/DC converter is supplied from both an AC power supply and the DC voltage of the inverter or an external DC power supply. For example, a power supply circuit described in Patent Document 1 is provided with a separate capacitor for input to a DC/DC converter and is configured such that charging can be performed by charging the capacitor from an AC power supply via a relay contact and a rectifier or by charging the capacitor from the DC voltage of an inverter. That is, while the inverter is being operated, the capacitor is charged from the DC voltage of the inverter, whereas, while the inverter is stopped, the capacitor is charged from the AC power supply. Consequently, detection of the DC voltage of the inverter is realized.

A power system described in Patent Document 2 transmits and receives power between an electric automobile and a power grid and has, between the power grid and a battery for the automobile, a charging/discharging circuit, a bidirectional inverter circuit, and a control circuit for these circuits. A voltage based on a DC voltage supplied from a DC power supply in the automobile is selected as an operation voltage of the control circuit, whereby suppression of power consumption and generation of stable voltage are achieved.

CITATION LIST

Patent Document

Patent Document 1: Japanese Laid-Open Utility Model Publication No. 5-62193
Patent Document 2: Japanese Laid-Open Patent Publication No. 2012-70536

SUMMARY OF THE INVENTION

Problem to be Solved by the Invention

Regarding means for generating a voltage of a control circuit, it is known that a power supply circuit such as a DC/DC converter can suppress power consumption by performing power conversion such that the difference in voltage between input and output is small. However, the device described in Patent Document 1 is configured to charge the capacitor for the DC/DC converter so as to prioritize the higher DC voltage. Consequently, while the inverter is being operated, power is constantly supplied from the DC voltage of a main circuit to a control circuit. This constant supply might cause generation of power loss and deterioration of the efficiency of the entire system. In addition, a problem arises in that control power is lost at the time of a power outage of the AC power supply.

In the device described in Patent Document 2, when power is supplied from the power grid or a power generation system, an operation voltage of the control circuit is constantly selected from power supply circuits connected to these power supplies. Thus, there are limitations to the condition of generating an operation voltage of the control circuit on the basis of a DC voltage supplied from the DC power supply in the electric automobile, and a problem arises in that the effect of suppressing power consumption is not sufficiently obtained.

The present disclosure has been made to solve the above problems and provides a DC power distribution system and a control power generation device in which voltage values are set according to voltage fluctuations of a plurality of power supply sources so as to generate control power for the system from any of the power supply sources so that the system can be continuously operated even at the time of an abnormality due to a device failure and a power outage, and control power consumption is suppressed in the case of voltage fluctuations of the power supply sources.

Means to Solve the Problem

A DC power distribution system according to the present disclosure is a DC power distribution system in which a power distribution network for supplying power from a plurality of power supply sources to a plurality of electric loads is formed, the DC power distribution system including: a power conversion circuit which is connected between the plurality of power supply sources and the plurality of electric loads and which supplies power corresponding to each of the electric loads; and a control power generation unit which supplies control power for controlling the power conversion circuit. The control power generation unit includes: a control device which receives detected voltages of the respective power supply sources and which, when the detected voltages having been received are larger than a predetermined value, sets voltage command values based on the respective detected voltages; a plurality of power supply circuits which are connected to the respective power supply sources and which output DC voltages obtained by performing conversion according to the voltage command values; and a control power circuit which supplies, to the power conversion circuit, control power based on one of the outputs from the plurality of power supply circuits. The control device sets, to a largest value, the voltage command value corresponding to a lowest voltage among the detected voltages larger than the predetermined value.

Effect of the Invention

In the DC power distribution system according to the present disclosure, voltage command values are set according to voltage fluctuations of the plurality of power supply sources, and one of outputs from the plurality of power supply circuits which output DC voltages obtained by performing conversion according to the voltage command values is supplied to the power conversion circuit as control power so that the system can be continuously operated even at the time of an abnormality due to a device failure and a power outage, and control power consumption can be suppressed in the case of voltage fluctuations of the power supply sources.

DESCRIPTION OF EMBODIMENTS

Figure 1:
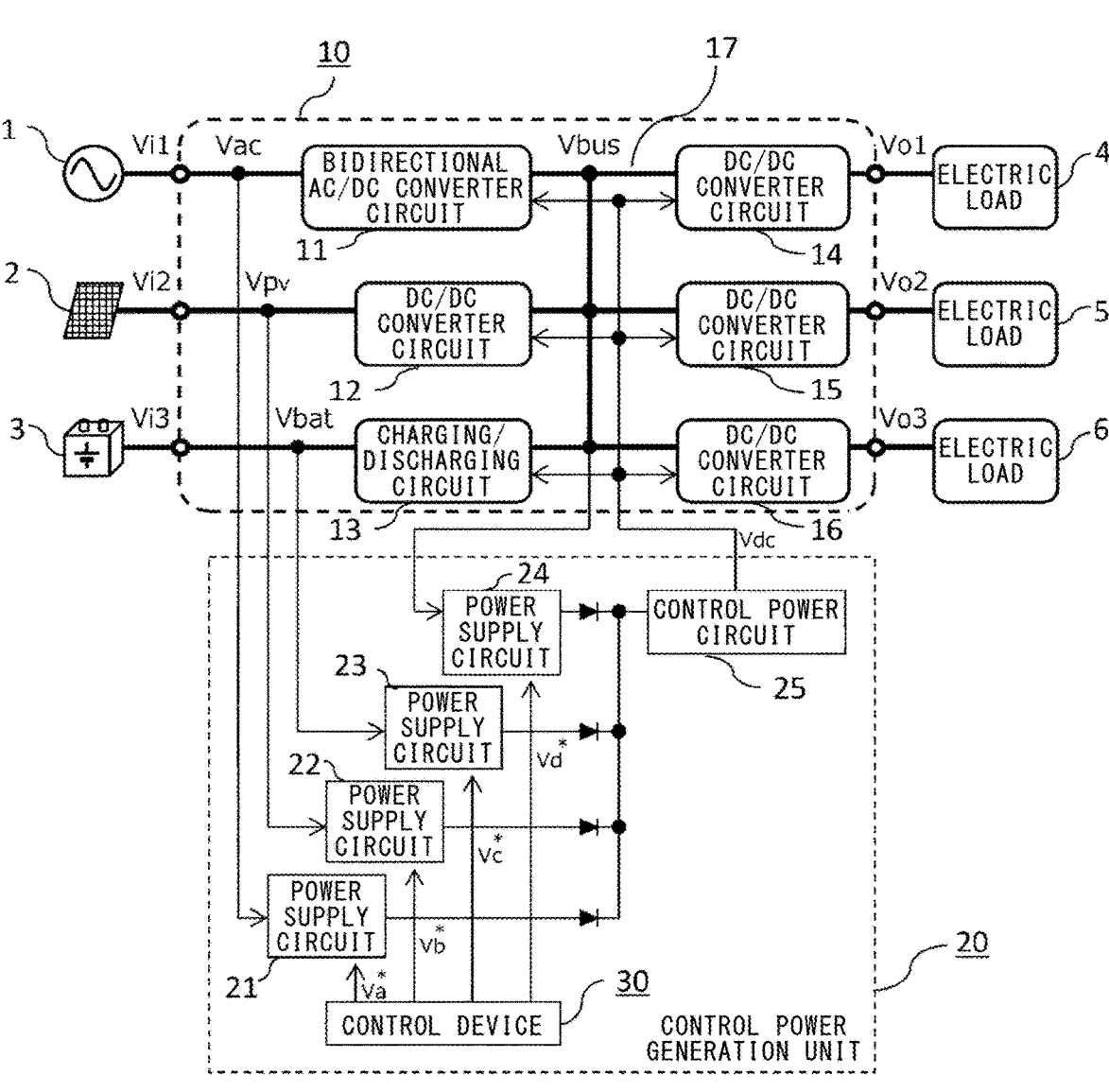
FIG. 1 is a configuration diagram of the entirety of a DC power distribution system according to embodiment 1.

Hereinafter, DC power distribution systems according to suitable embodiments of the present disclosure will be described with reference to the drawings. The same features and corresponding parts are denoted by the same reference characters, and detailed descriptions thereof will be omitted. In the subsequent embodiments as well, redundant descriptions of constituents denoted by the same reference characters will be omitted.

Embodiment 1

Figure 2:
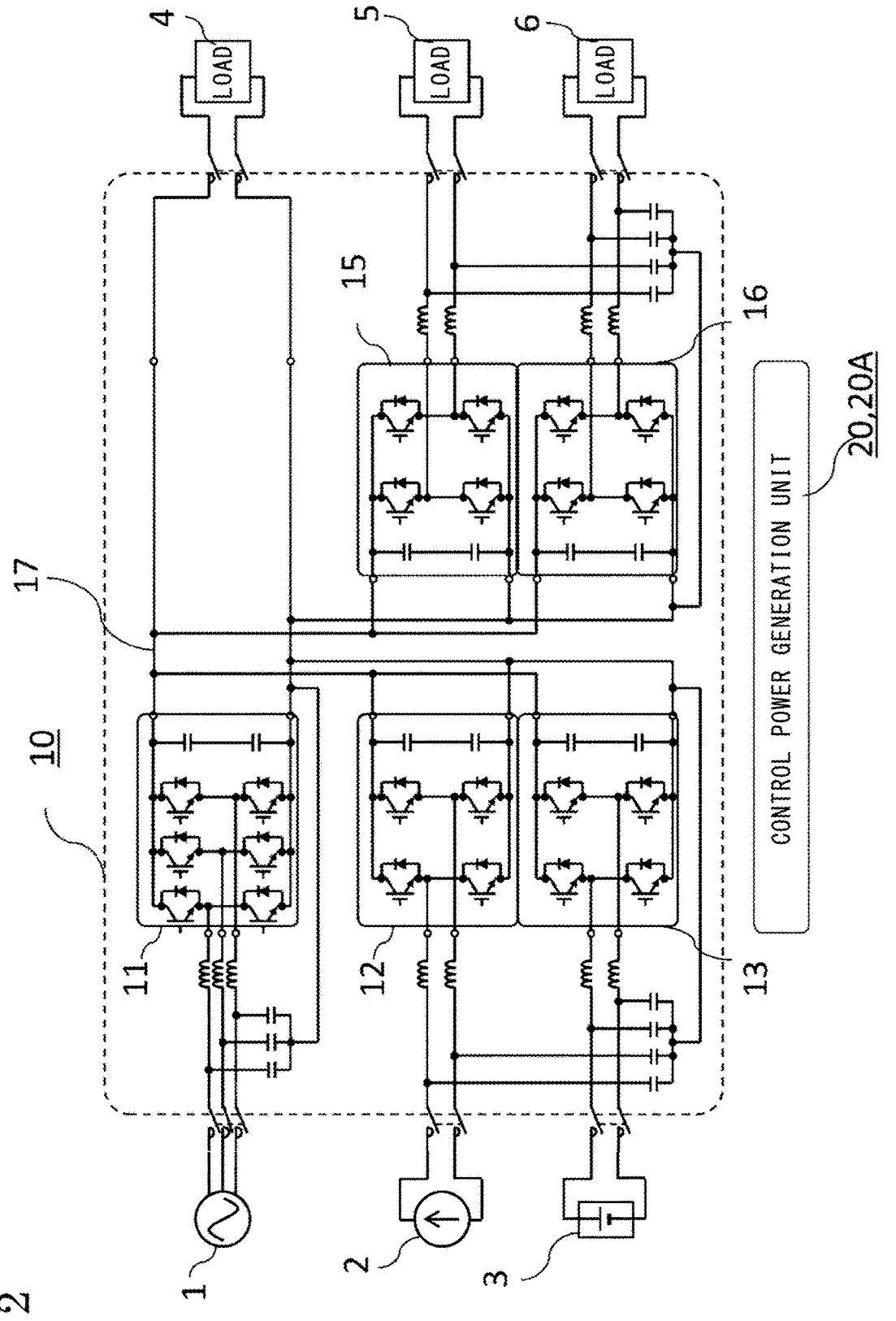
FIG. 2 schematically shows each of DC/DC converter circuits in a power conversion device according to embodiment 1.

FIG. 1 is a configuration diagram of the entirety of a DC power distribution system according to embodiment 1. The DC power distribution system includes: a power conversion device 10 connected between a plurality of power supply sources which are a grid power supply 1, a solar cell 2, and a storage battery 3, and a plurality of electric loads 4 to 6; and a control power generation unit 20 which supplies control power to the power conversion device 10. In the case of the present embodiment, for example, the power conversion device 10 includes: a bidirectional AC/DC converter circuit 11 which is connected between the grid power supply 1 and a DC bus electrical path 17 and which performs bidirectional conversion between AC power and DC power; a DC/DC converter circuit 12 which is connected between the solar cell 2 among the plurality of power supplies and the DC bus electrical path 17 and which converts DC power; a charging/discharging circuit 13 which is connected between the storage battery 3 among the plurality of power supplies and the DC bus electrical path 17 and which performs charging/discharging of the storage battery 3; and DC/DC converter circuits 14 to 16 which are connected between the DC bus electrical path 17 and the plurality of electric loads 4 to 6 and which convert DC power transmitted through the DC bus electrical path 17. FIG. 2 schematically and specifically shows each of the DC/DC converter circuits in the power conversion device 10. Connection between the control power generation unit 20 and the power conversion device 10 is not shown. In each of embodiments 2 and 3 as well, the power conversion device 10 has the same circuit configuration as that in FIG. 2.

In FIG. 1, the control power generation unit 20 includes power supply circuits 21 to 24 which respectively receive a voltage Vac obtained from the grid power supply 1, a voltage Vpv obtained from the solar cell 2, a voltage Vbat obtained from the storage battery 3, and a voltage Vbus obtained from the DC bus electrical path 17 and which convert the respective input voltages to desired DC voltages according to voltage command values calculated by a control device 30. The outputs from the respective power supply circuits 21 to 24 are compared at diodes, and then, the resultant output is inputted to a control power circuit 25 which outputs control power Vdc.

Figure 3:
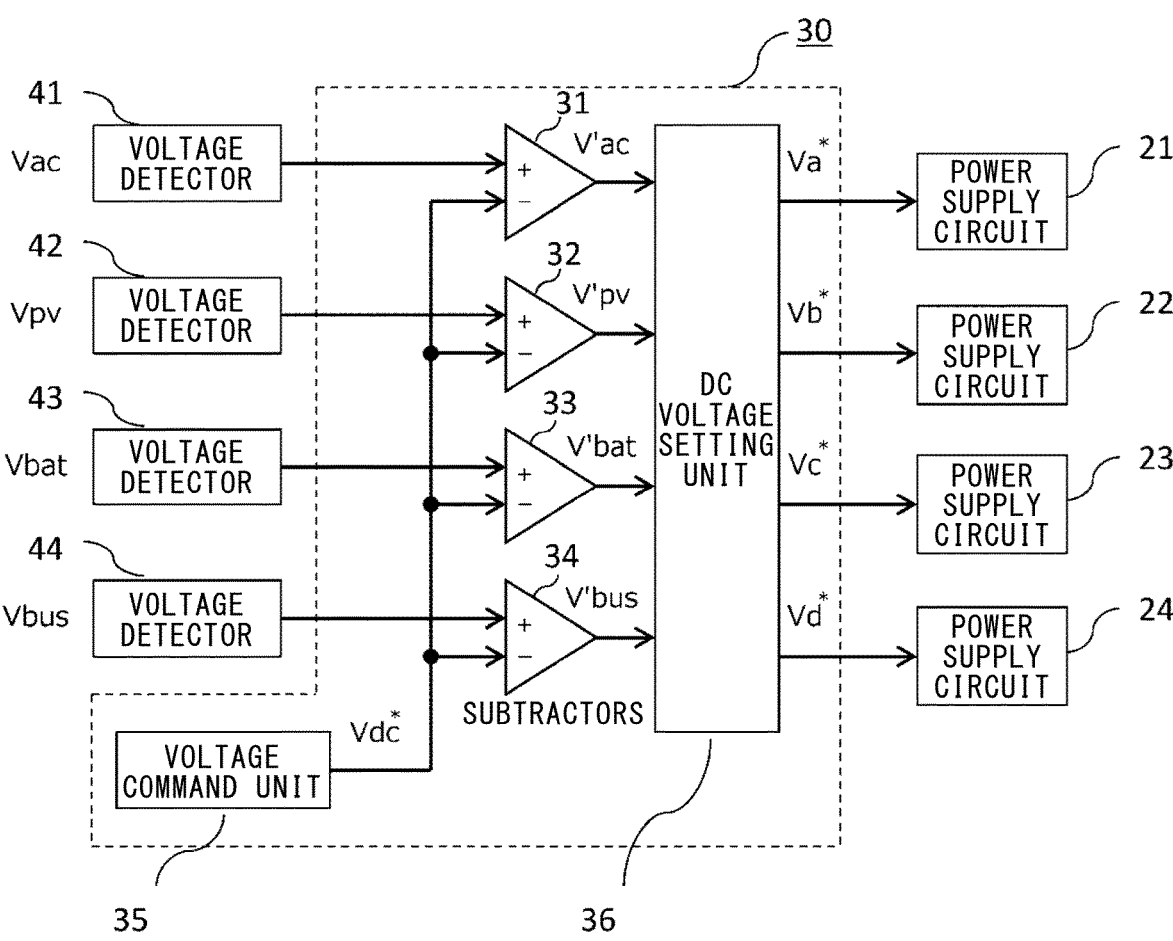
FIG. 3 is a function block diagram of a control device according to embodiment 1.

FIG. 3 is a function block diagram of the control device 30 in FIG. 1. The control device 30 is composed of: subtractors 31 to 34 which respectively receive the voltage Vac obtained from the grid power supply 1 by a voltage detector 41, the voltage Vpv obtained from the solar cell 2 by a voltage detector 42, the voltage Vbat obtained from the storage battery 3 by a voltage detector 43, and the voltage Vbus obtained from the DC bus electrical path 17 by a voltage detector 44 and which each subtract, from the corresponding one of the received voltages, a voltage command value Vdc* outputted from a voltage command unit 35; and a DC voltage setting unit 36 which outputs voltage command values Va* to Vd* to the power supply circuits 21 to 24 according to the outputs from the subtractors 31 to 34.

Figures 4A, 4B:
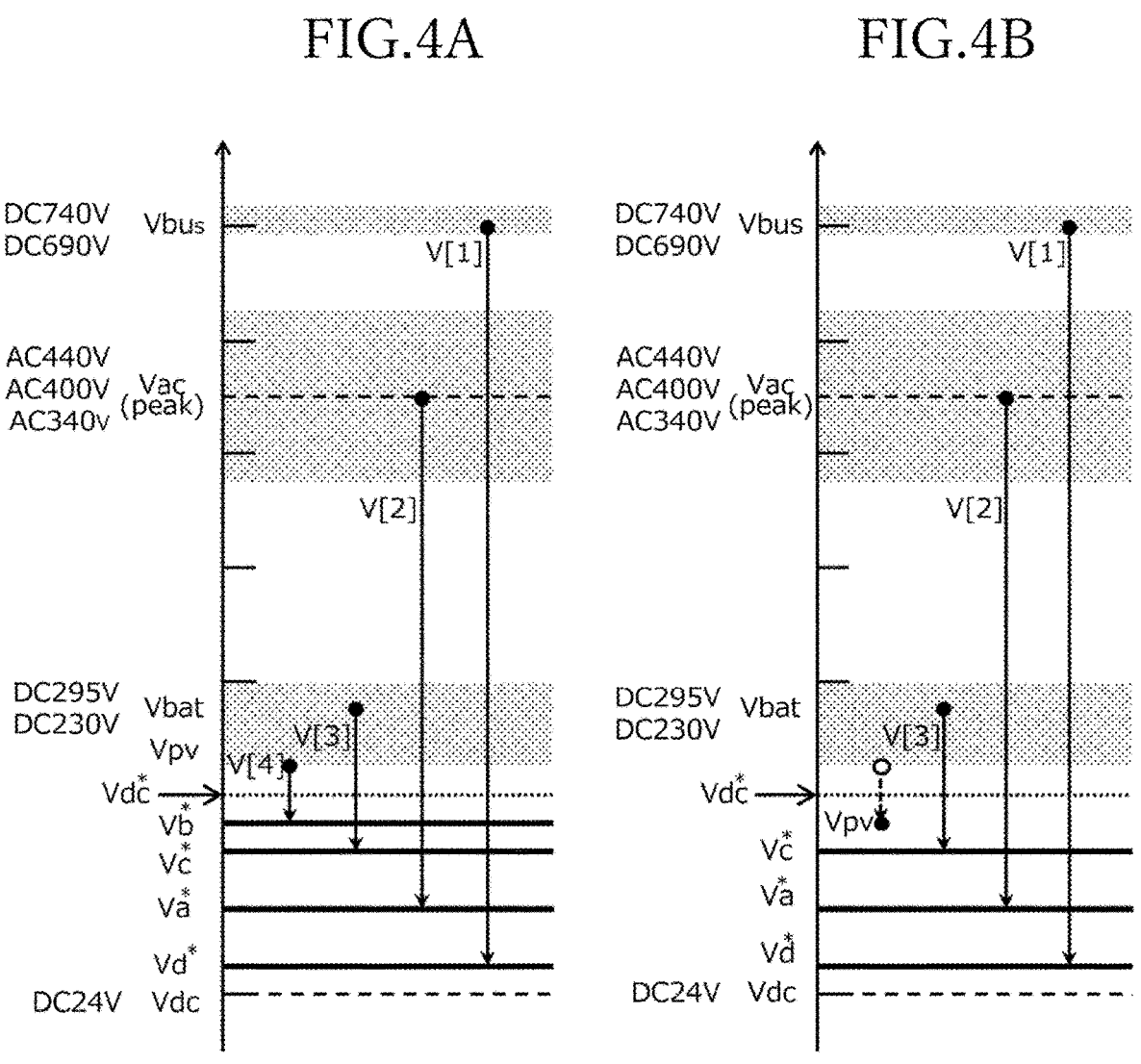
FIGS. 4A and 4B show relationships in magnitude among power supply voltages of power supply sources in FIG. 1.

Next, operations of the control power generation unit 20 which is thus configured will be described. FIGS. 4A and 4B show relationships in magnitude among the power supply voltages of the power supply sources in FIG. 1. In FIG. 4A, in a case where, for example, the AC voltage Vac obtained from the grid power supply 1 is AC 400 V, the peak value of the voltage Vac is about 565 V. Furthermore, description will be given in relation to an operation in a case where: the voltage Vpv obtained from the solar cell 2 is DC 230 V; the DC voltage Vbat obtained from the storage battery 3 is DC 266 V; and the DC voltage Vbus obtained from the DC bus electrical path 17 is DC 690 V.

Figures 5A, 5B, 5C:
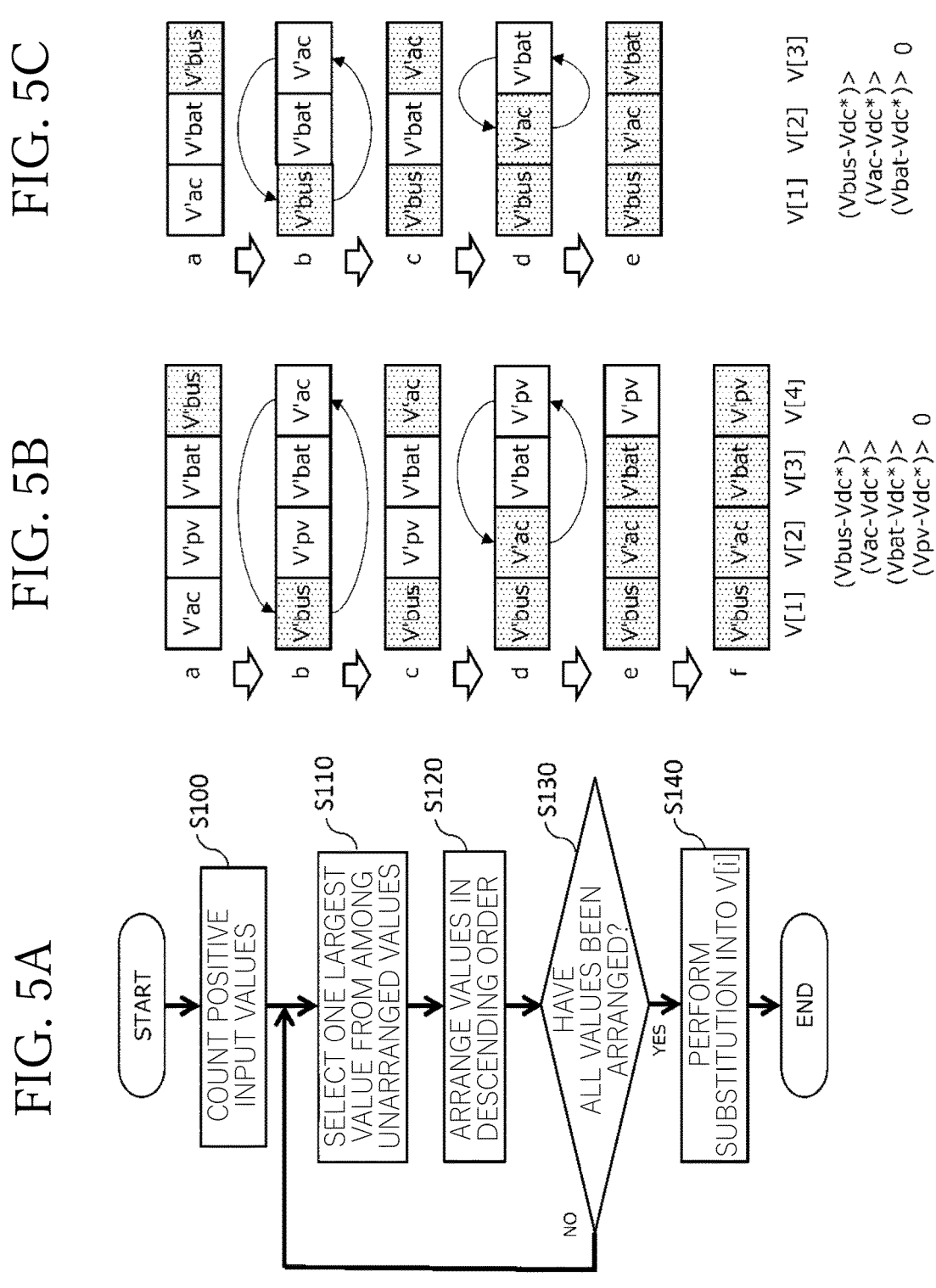
FIGS. 5A, 5B and 5C explain selection of a highest voltage according to embodiment 1.

FIGS. 5A to 5C explain selection of a highest voltage. FIG. 5A is a flowchart of selection of a highest voltage, and FIG. 5B and FIG. 5C are schematic diagrams each showing a procedure of arranging input values. The control device 30 shown in FIG. 3 receives the voltage Vac obtained from the grid power supply 1 by the voltage detector 41, the voltage Vpv obtained from the solar cell 2 by the voltage detector 42, the voltage Vbat obtained from the storage battery 3 by the voltage detector 43, and the voltage Vbus obtained from the DC bus electrical path 17 by the voltage detector 44 and subtracts, by the subtractors 31 to 34, the voltage command value Vdc* outputted from the voltage command unit 35. Here, these voltages are in the following relationship.

$$V'ac = Vac - Vdc^*$$

$$V'pv = Vpv - Vdc^*$$

$$V'bat = Vbat - Vdc^*$$

$$V'bus = Vbus - Vdc^*$$

The DC voltage setting unit 36 counts positive input values among the voltages V'ac, V'pv, V'bat, and V'bus (step S100). As shown in FIG. 4A, all the voltages Vac, Vpv, Vbat, and Vbus are larger than the voltage command value Vdc*, and thus all the voltages V'ac, V'pv, V'bat, and V'bus obtained by subtracting the voltage command value Vdc* are counted as positive values.

Next, one largest value is selected from among the unarranged positive input values (step S110), and the positive input values are arranged in descending order (step S120). In FIG. 5B, since the voltage V'bus is the largest value, V'ac and V'bus are interchanged in order to place this largest value at the head. Post-interchange V'ac and V' pv are compared, and, when V'ac is larger, V'ac and V'pv are interchanged. In this manner, comparison calculation continues to be performed until all the counted positive input values are arranged (step S130).

In FIG. 5B, a condition represented by the following "(expression 1)" is established, and the DC voltage V'pv obtained from the solar cell 2 is selected as the lowest voltage.

$$V'bus > V'ac > V'bat > V'pv > 0 \qquad \text{(expression 1)}$$

From the calculation result of "(expression 1)", the DC voltage setting unit 36 outputs a voltage command value Va* to the power supply circuit 21, outputs a voltage command value Vb* to the power supply circuit 22, outputs a voltage command value Vc* to the power supply circuit 23, and outputs a voltage command value Vd* to the power supply circuit 24. Here, the voltage command values are set to be in the relationship in magnitude represented by "(expression 2)" below. That is, the voltage command value Vb* is set such that a difference V[4] between V'pv having been selected and the voltage command value Vb* (see FIG. 4A) becomes smallest. From the condition represented by "(expression 1) ", each of the voltage command values is set such that a difference V[i] between the corresponding one of the arranged input values and the voltage command value becomes small (step S140), whereby a relationship represented by" (expression 2)" is established.

$$Vb^* > Vc^* > Va^* > Vd^* \qquad \text{(expression 2)}$$

As described above, the outputs from the power supply circuits 21 to 24 are compared at the diodes, and, from the relationship represented by "(expression 2)", an output voltage Vb from the power supply circuit 22 is inputted to the control power circuit 25.

Meanwhile, in FIG. 4B, description will be given in relation to an operation in a case where the voltage Vpv obtained from the solar cell 2 becomes DC 175 V owing to change in a meteorological environment such as the quantity of solar radiation. The DC voltage setting unit 36 counts positive input values among V'ac, V'pv, V'bat, and V'bus (step S100). In this case, V'pv is a negative value, and thus, is excluded from the arrangement targets.

One largest value is selected from among the unarranged values (step S110), and the voltages V'ac, V'bat, and V'bus as positive input values are arranged in descending order (step S120). In FIG. 5C, since V'bus is the largest value, V'ac and V'bus are interchanged in order to place this largest value at the head. Post-interchange V'ac and V'bat are compared, and, when V'ac is larger, V'ac and V'bat are interchanged. In this manner, comparison calculation continues to be performed until all the counted input values are arranged (step S130).

In FIG. 5C, a condition represented by the following "(expression 3)" is established, and the DC voltage V'bat obtained from the storage battery 3 is selected as the lowest voltage.

$$V'bus > V'ac > V'bat > 0 \qquad \text{(expression 3)}$$

From the calculation result of "(expression 3)", the DC voltage setting unit 36 outputs the voltage command value Va* to the power supply circuit 21, outputs a stoppage command to the power supply circuit 22, outputs the voltage command value Vc* to the power supply circuit 23, and outputs the voltage command value Vd* to the power supply circuit 24. Here, the voltage command values are set to be in the relationship in magnitude represented by expression (4) below. That is, the voltage command value Vc* is set such that a difference V[3] between V'bat having been selected and the voltage command value Vc* (see FIG. 4B) becomes smallest. From the condition represented by "(expression 3)", each of the voltage command values is set such that the difference V[i] between the corresponding one of the arranged input values and the voltage command value becomes small, whereby a relationship represented by "(expression 4)" is established.

$$Vc^* > Va^* > Vd^* \qquad \text{(expression 4)}$$

As described above, the outputs from the power supply circuits 21 to 24 are compared at the diodes, and, from the relationship represented by "(expression 4)", an output voltage Vc from the power supply circuit 22 is inputted to the control power circuit 25. In this manner, voltage values are arranged in descending order so as to cause the control device 30 to ascertain the relationship in magnitude among the voltage values, and the control device 30 keeps the relationship in magnitude among the voltage values. Consequently, even when Vpv and Vac are lost owing to change in the quantity of solar radiation and a power outage of the AC grid, another power supply source can be selected immediately. Thus, control power consumption can be suppressed without stopping the system in the case of voltage fluctuations of the power supply sources.

Figure 6:
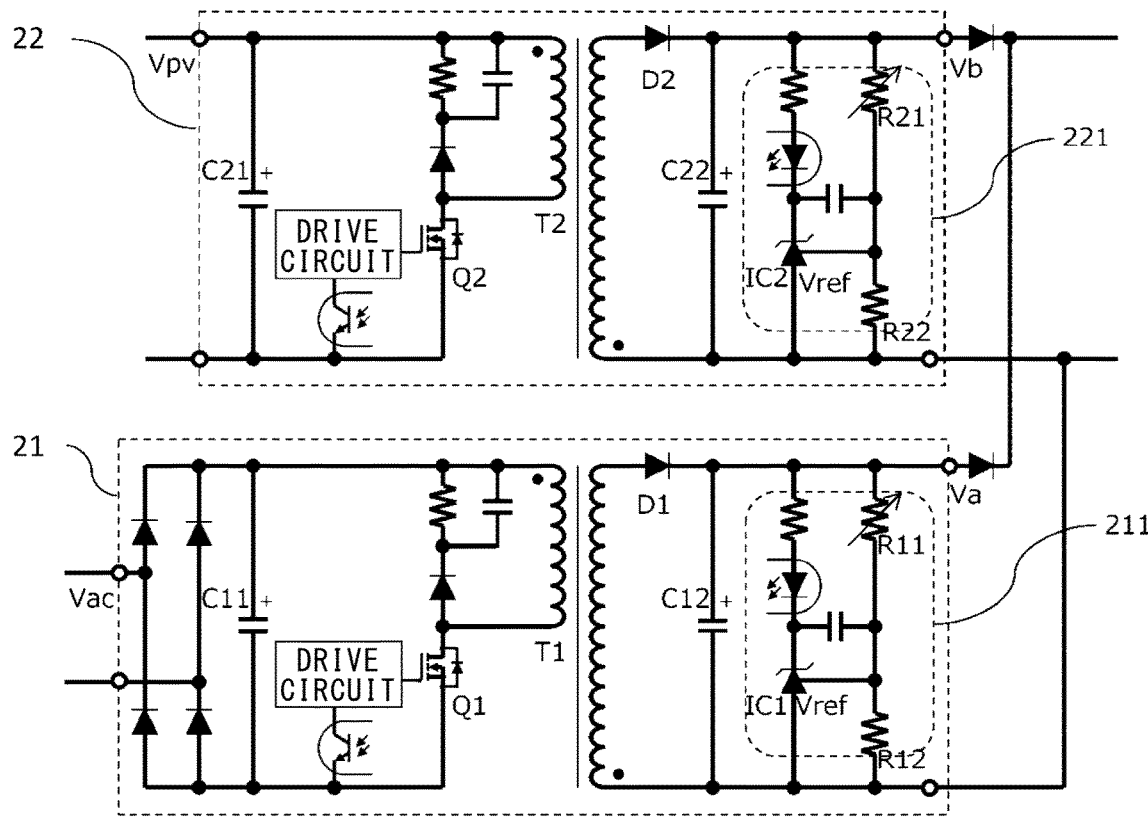
FIG. 6 is a circuit diagram showing an example of power supply circuits in embodiment 1.

FIG. 6 is a circuit diagram showing an example of the power supply circuits 21 and 22 provided to the control power generation unit 20. The power supply circuit 21 receives the voltage Vac obtained from the grid power supply 1, and the power supply circuit 22 receives the voltage Vpv obtained from the solar cell 2. Each of the power supply circuits 21 and 22 has a DC/DC converter circuit which is formed to be capable of electrical isolation from an output voltage.

The power supply circuit 21 has an output voltage setting unit 211 which is located in an output stage and which is composed of a shunt regulator IC1 and a plurality of resistors R11 and R12. The output voltage Va satisfies a relationship represented by the following "(expression 5)".

$$Va = Vref \times (R11 + R12)/R12 \qquad \text{(expression 5)}$$

The voltage command value Va* outputted from the DC voltage setting unit 36 is received, and the resistance value of the resistor R11 indicated in "(expression 5)" is variable accordingly, whereby the output voltage Va can be adjusted. Likewise, the power supply circuit 22 shown in FIG. 6 also has an output voltage setting unit 221. Furthermore, although not shown in FIG. 6, the power supply circuit 23 and the power supply circuit 24 are also configured in the same manner and each have a voltage setting unit which can adjust the output voltage thereof according to the corresponding voltage command value.

As described above, in embodiment 1, control power for the DC power distribution system is generated from the plurality of power supply sources. Consequently, the system can be continuously operated even at the time of an abnormality due to a device failure and a power outage. In addition, as described above, in embodiment 1, a power supply source for which the difference between the input and the output of the corresponding power supply circuit is small is selected. Consequently, control power consumption can be suppressed in the case of voltage fluctuations of the power supply sources. Although a configuration in which three electric loads are connected to the DC power distribution system has been described in the present embodiment, it is needless to say that the same advantageous effects are obtained also when the number of the electric loads is further increased.

Embodiment 2

Figure 7:
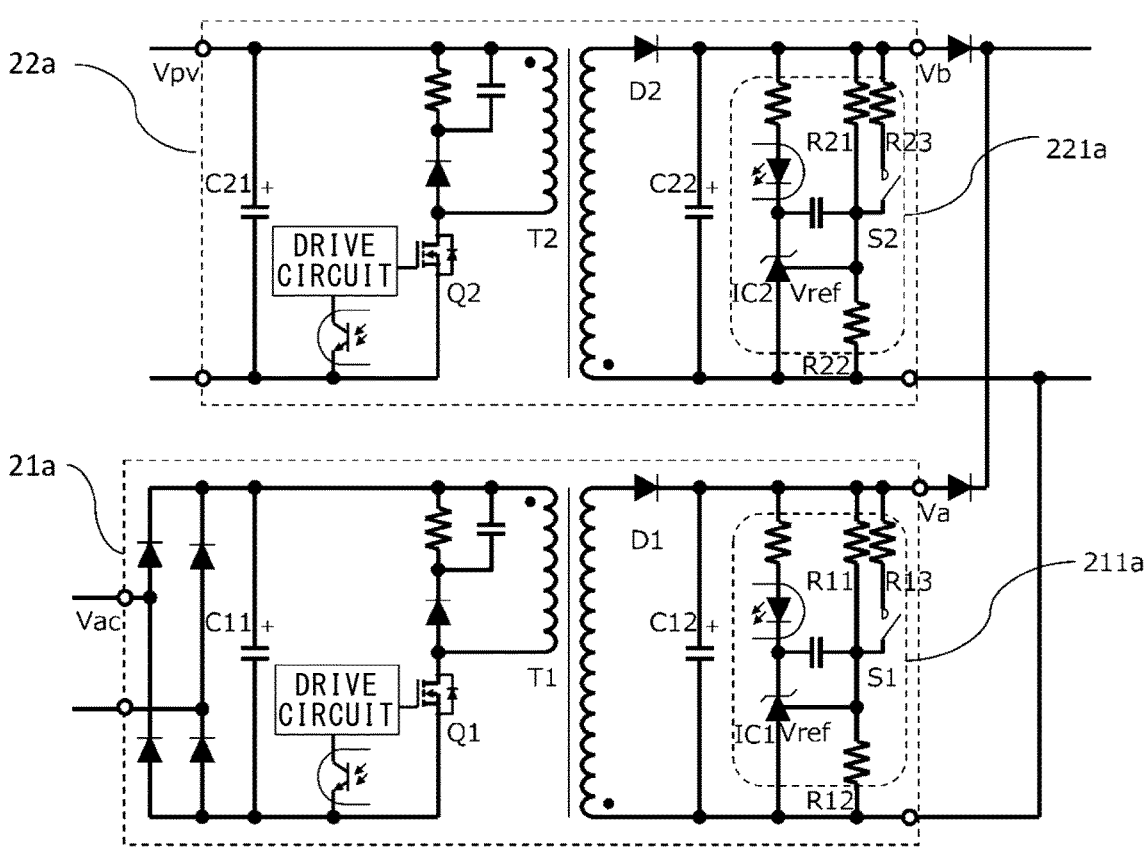
FIG. 7 is a circuit diagram showing an example of power supply circuits in embodiment 2.

FIG. 7 shows another example of the power supply circuits provided to the control power generation unit 20. A power supply circuit 21*a* receives the voltage Vac obtained from the grid power supply 1, and a power supply circuit 22*a* receives the voltage Vpv obtained from the solar cell 2. Each of the power supply circuits 21*a* and 22*a* has a DC/DC converter circuit which is formed to be capable of electrical isolation from an output voltage.

The power supply circuit 21*a* has an output voltage setting unit 211*a* which is located in an output stage and which is composed of the shunt regulator IC1, a plurality of resistors R11, R12, and R13, and an opening/closing switch S1. The opening/closing switch S1 performs switching between a conducting state and an opened state according to an output signal from the control device 30. Likewise, the power supply circuit 22*a* shown in FIG. 7 also has an output voltage setting unit 221*a*. Furthermore, although not shown in FIG. 7, the other power supply circuit, i.e., the power supply circuit which receives the voltage Vbat obtained from the storage battery 3 and the power supply circuit which receives the voltage Vbus obtained from the DC bus electrical path 17, may be configured in the same manner.

Hereinafter, operation will be described by using the power supply circuit 21*a*, and the other power supply circuits having similar configurations perform similar operations. In a case where the opening/closing switch S1 is in the conducting state, the output voltage Va satisfies a relationship represented by the following "(expression 6)".

$$Va = Vref \times (R11 \times R13/(R11 + R13) + R12)/R12 \qquad \text{(expression 6)}$$

Meanwhile, in a case where the opening/closing switch S1 is in the opened state, the output voltage Va satisfies a relationship represented by the following "(expression 7)".

$$Va = Vref \times (R11 + R12)/R12 \qquad \text{(expression 7)}$$

Each of the opening/closing switches performs switching between the conducting state and the opened state according to a calculation result from the control device 30, whereby the output voltage of the relevant power supply circuit is changed according to "(expression 6)" or "(expression 7)".

As described above, in embodiment 2, control power for the DC power distribution system is generated from the plurality of power supply sources, and each of the power supply circuits provided to the control power generation unit 20 has an output voltage setting unit 211*a* or 221*a* which is located in an output stage and which is composed of the shunt regulator, the plurality of resistors, and the opening/closing switch. Consequently, switching between the output voltages of the plurality of power supply circuits can be performed. Thus, the system can be continuously operated even at the time of an abnormality due to a device failure and a power outage, and power that is necessary for the control power can be selectively obtained from a desired one of the power supply sources. Although an opening/closing device that is mechanically operated is shown as each of the opening/closing switches S1 and S2 in the present embodiment, it is needless to say that the same advantageous effects are obtained also when switching between the conducting state and the opened state is performed by using electrical semiconductor switches. By increasing the number of resistors between which switching is performed, switching can be performed in the same manner as in the case of the variable resistor described in embodiment 1.

Embodiment 3

Figure 8:
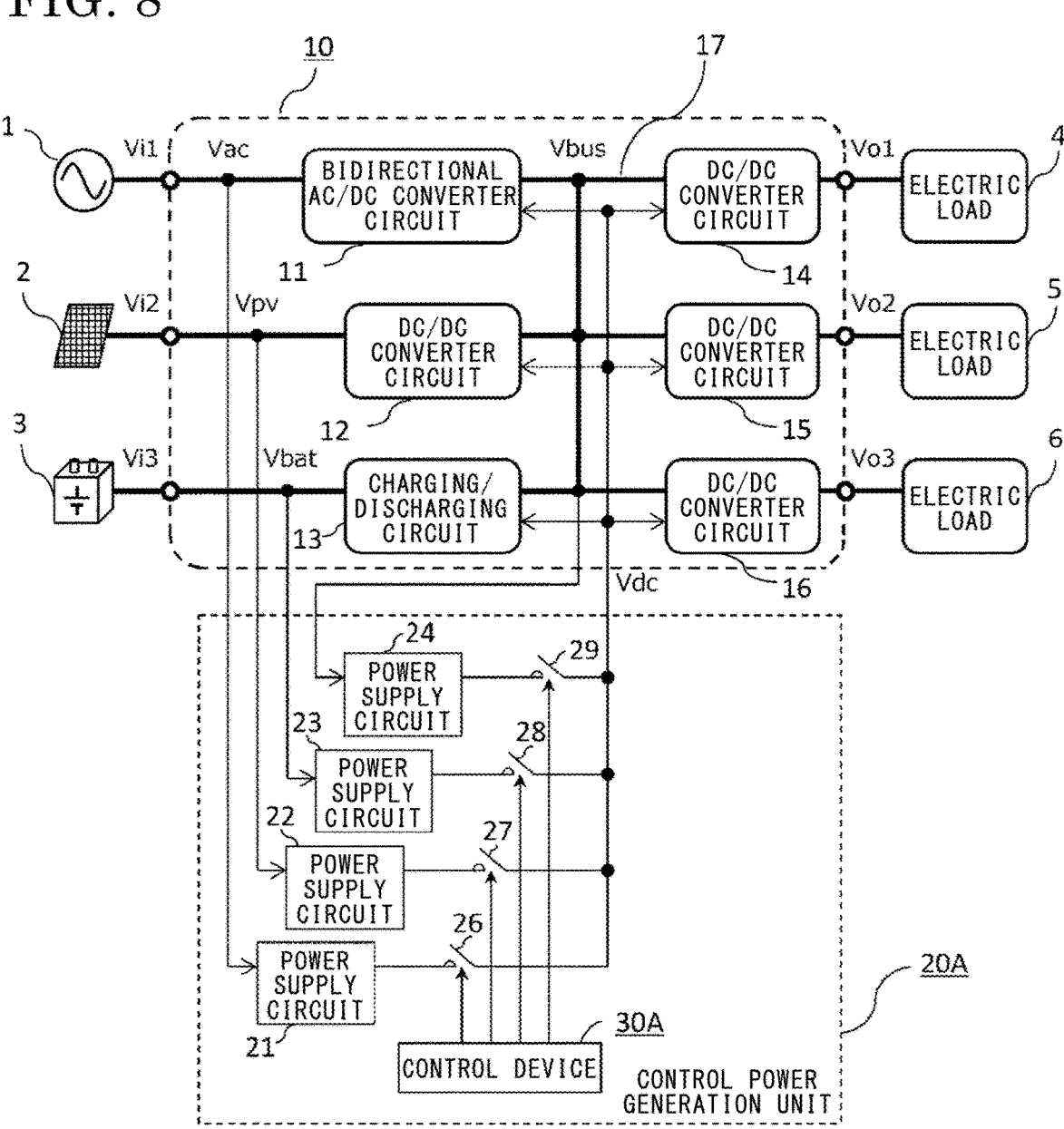
FIG. 8 is a configuration diagram of the entirety of a DC power distribution system according to embodiment 3.

Hereinafter, a configuration of a DC power distribution system according to embodiment 3 will be described. FIG. 8 is a configuration diagram of the entirety of the DC power distribution system according to embodiment 3. The DC power distribution system includes: the power conversion device 10 connected between the plurality of power supply sources which are the grid power supply 1, the solar cell 2, and the storage battery 3, and the plurality of electric loads 4 to 6; and a control power generation unit 20A which supplies control power to the plurality of circuits built in the power conversion device 10.

The control power generation unit 20A includes: the power supply circuits 21 to 24 which respectively receive the voltage Vac obtained from the grid power supply 1, the voltage Vpv obtained from the solar cell 2, the voltage Vbat obtained from the storage battery 3, and the voltage Vbus obtained from the DC bus electrical path 17 and which output preset control power Vdc; and opening/closing switches 26 to 29 which are located on the output side of the power supply circuits 21 to 24 and which perform switching between a conducting state and an opened state for an electrical path through which control power is supplied to the plurality of DC/DC converter circuits 12 and 14 to 16, the bidirectional AC/DC converter circuit 11, and the charging/discharging circuit 13 built in the power conversion device 10.

Figure 9:
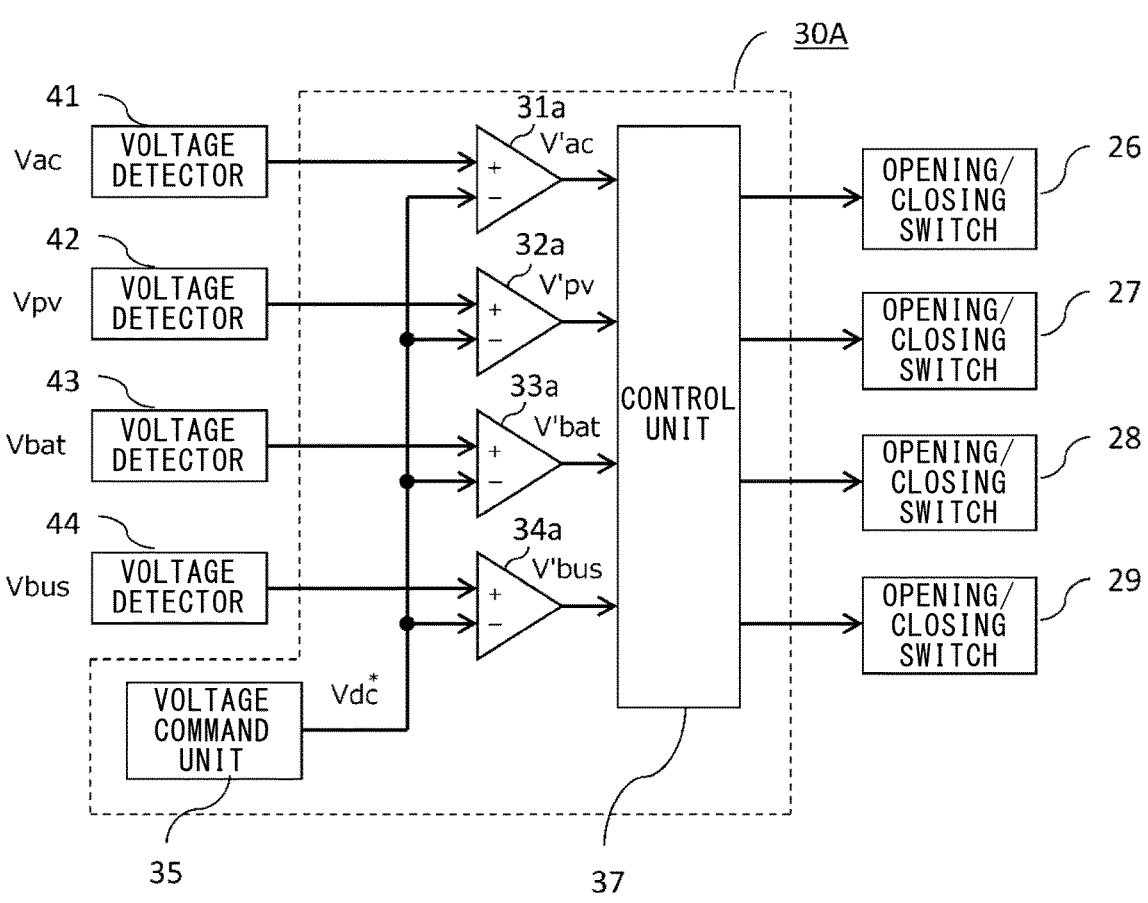
FIG. 9 is a function block diagram of a control device according to embodiment 3.

FIG. 9 is a function block diagram of a control device 30A according to embodiment 3. The control device 30A is composed of: subtractors 31*a* to 34*a* which respectively receive the voltage Vac obtained from the grid power supply 1 by the voltage detector 41, the voltage Vpv obtained from the solar cell 2 by the voltage detector 42, the voltage Vbat obtained from the storage battery 3 by the voltage detector 43, and the voltage Vbus obtained from the DC bus electrical path 17 by the voltage detector 44 and which each subtract, from the corresponding one of the received voltages, the voltage command value Vdc* outputted from the voltage command unit 35; and a control unit 37 which outputs signals for switching the states of the opening/closing switches 26 to 29 between the conducting state and the opened state.

Figure 10:
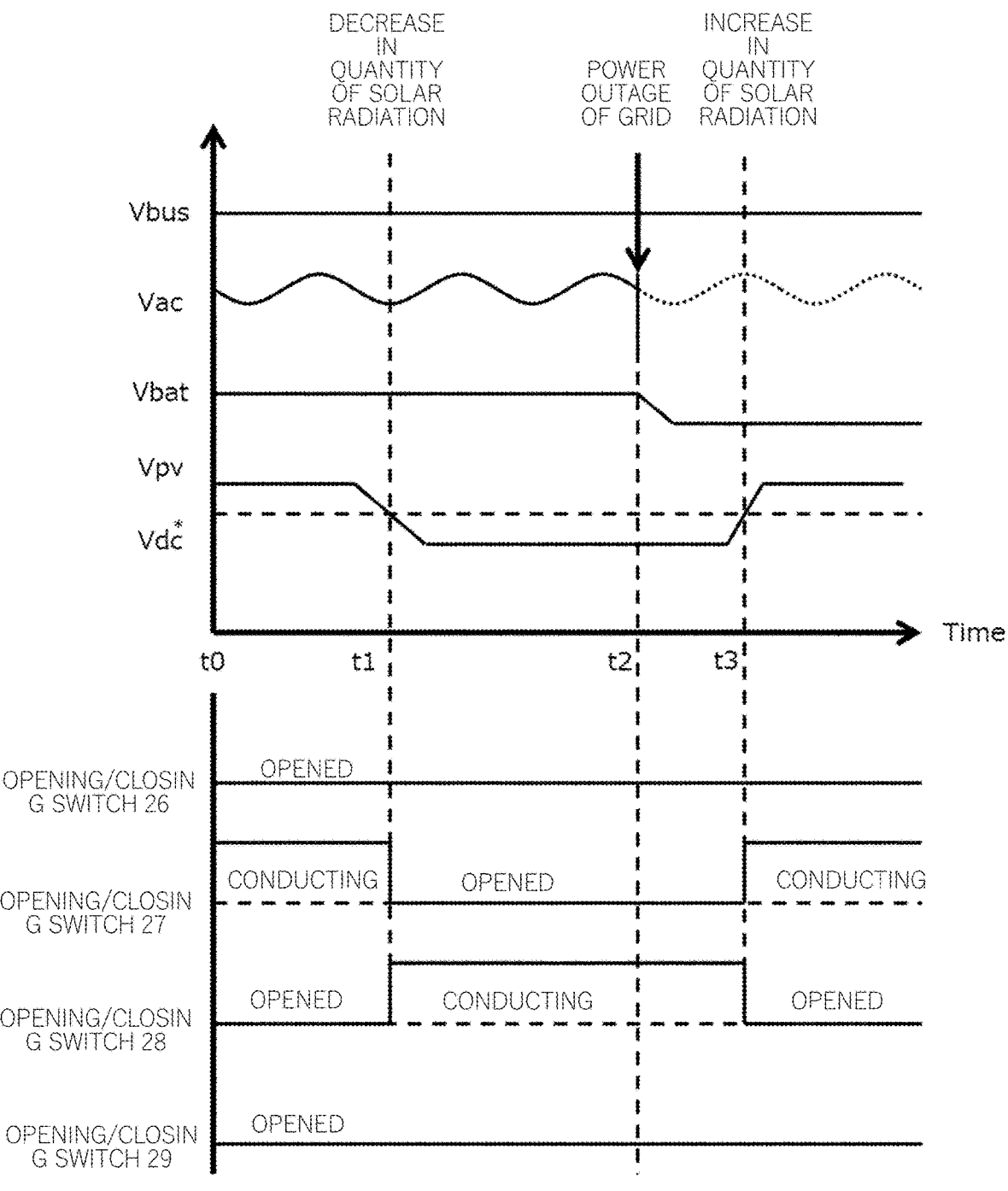
FIG. 10 is a time chart showing the relationship in magnitude among the power supply voltages and operations of opening/closing switches, in embodiment 3.

FIG. 10 is a time chart showing the relationship in magnitude among the power supply voltages and operations of the opening/closing switches, in embodiment 3. First, at a time point to, the voltage Vpv obtained from the solar cell 2 is larger than the voltage command value Vdc* and the difference between the voltage Vpv and the voltage command value Vdc* is smallest, and thus the opening/closing switch 27 shown in FIG. 9 is set to enter the conducting state, and the other opening/closing switches 26, 28, and 29 are each set to enter the opened state.

Next, at a time point t1, the voltage Vpv obtained from solar cell 2 becomes smaller than the voltage command value Vdc* owing to change in the quantity of solar radiation or the like, and at this time, the opening/closing switch 27 is set to enter the opened state, and the opening/closing switch 28 is set to enter the conducting state. Through these operations, the control power Vdc can be obtained from the voltage Vbat obtained from the storage battery 3, with the voltage Vbat being larger than the voltage command value Vdc* and with the difference between the voltage Vbat and the voltage command value Vdc* being smallest.

Furthermore, at a time point t2, the voltage Vac obtained from the grid power supply 1 is lost owing to an influence such as a power outage, and even in this case, the control power Vdc is continuously obtained from the voltage Vbat obtained from the storage battery 3. Lastly, at a time point t3, the voltage Vpv obtained from the solar cell 2 exceeds the voltage command value Vdc* owing to change in the quantity of solar radiation or the like, and at this time, the opening/closing switch 28 is set to enter the opened state, and the opening/closing switch 27 is set to enter the conducting state.

As described above, in the DC power distribution system and the control power device thereof according to the present embodiment 3, control power for the system is generated from the plurality of power supply sources, and the opening/closing switches 26 to 29 which perform switching between the conducting state and the opened state for the electrical path through which control power is supplied are provided on the output sides of the power supply circuits which each output the preset control power Vdc. Consequently, the system can be continuously operated even at the time of an abnormality due to a device failure and a power outage. In addition, as described above, in the DC power distribution system and the control power device thereof, a power supply source for which the difference between the input and the output of the corresponding power supply circuit is small is selected. Consequently, control power consumption can be suppressed in the case of voltage fluctuations of the power supply sources.

Although an opening/closing device that is mechanically operated is shown as each of the opening/closing switches in the present embodiment, it is needless to say that the same advantageous effects are obtained also when switching between the conducting state and the opened state is performed by using electrical semiconductor switches.

Figure 11:
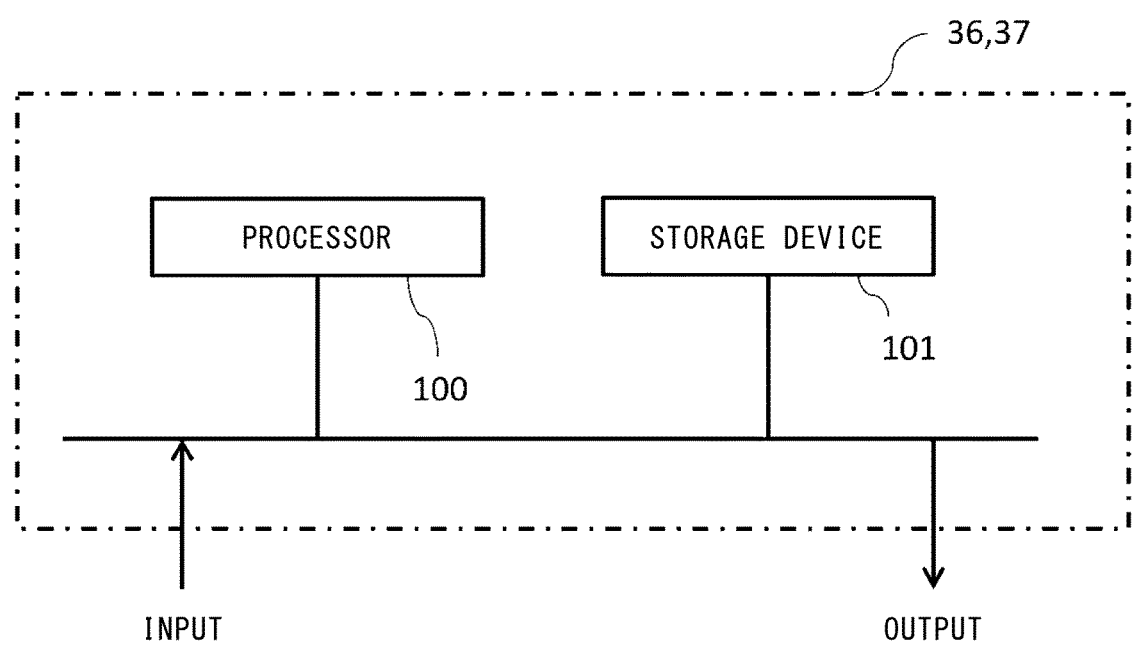
FIG. 11 shows an example of a hardware configuration of each of a DC voltage setting unit and a control unit.

An example of hardware of each of the DC voltage setting unit 36 in embodiment 1 and the control unit 37 in embodiment 3 may be, as shown in FIG. 11, composed of a processor 100 and a storage device 101. Although not shown, the storage device 101 includes a volatile storage device such as a random access memory and a nonvolatile auxiliary storage device such as a flash memory. Alternatively, the storage device 101 may include, as the auxiliary storage device, a hard disk instead of a flash memory. As the processor 100, a central processing unit (CPU), an application specific integrated circuit (ASIC), an integrated circuit (IC), a field programmable gate array (FPGA), any type of logic circuit, any type of signal processing circuit, etc., may be provided. Also, a plurality of the processors 100 of the same type or different types may be provided so as to execute allocated respective processes.

Although the disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the specification of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS

1 grid power supply
2 solar cell
3 storage battery
4, 5, 6 electric load
10 power conversion device
11 bidirectional AC/DC converter circuit
12, 14, 15, 16 DC/DC converter circuit
13 charging/discharging circuit
17 DC bus electrical path
20, 20A control power generation unit
21, 21a, 22, 22a, 23, 24 power supply circuit
25 control power circuit
26, 27, 28, 29 opening/closing switch
30, 30A control device
35 voltage command unit
36 DC voltage setting unit
37 control unit
41, 42, 43, 44 voltage detector

The invention claimed is:

1. A DC power distribution system in which a power distribution network for supplying power from a plurality of power supply sources to a plurality of electric loads is formed, the DC power distribution system comprising:

a power conversion circuit which is connected between the plurality of power supply sources and the plurality of electric loads and which supplies power corresponding to each of the electric loads; and a control power generator which supplies control power for controlling the power conversion circuit, wherein the control power generator includes a control device which receives detected voltages of the respective power supply sources and which, when the detected voltages having been received are larger than a predetermined value, sets voltage command values based on the respective detected voltages, a plurality of power supply circuits which are connected to the respective power supply sources and which output DC voltages obtained by performing conversion according to the voltage command values, and a control power circuit which supplies, to the power conversion circuit, control power based on one of the outputs from the plurality of power supply circuits, and the control device sets, to a largest value, the voltage command value corresponding to a lowest voltage among the detected voltages larger than the predetermined value.

2. The DC power distribution system according to claim 1, wherein each of the plurality of power supply circuits has a DC/DC converter circuit which is formed to be capable of electrical isolation between a voltage from the corresponding power supply source and an output voltage, and an output voltage setter which is located in an output stage and which is composed of a shunt regulator, a plurality of resistors, and an opening/closing switch, and the opening/closing switch performs switching between a conducting state and an opened state according to an output signal from the control device.

3. The DC power distribution system according to claim 2, wherein the plurality of power supply sources and the plurality of electric loads are connected to each other by a DC bus electrical path.

4. The DC power distribution system according to claim 3, wherein the plurality of power supply sources include at least two out of a grid power supply, a storage battery, and a solar cell.

5. The DC power distribution system according to claim 2, wherein the plurality of power supply sources include at least two out of a grid power supply, a storage battery, and a solar cell.

6. The DC power distribution system according to claim 1, wherein the plurality of power supply sources and the plurality of electric loads are connected to each other by a DC bus electrical path.

7. The DC power distribution system according to claim 6, wherein the plurality of power supply sources include at least two out of a grid power supply, a storage battery, and a solar cell.

8. The DC power distribution system according to claim 1, wherein the plurality of power supply sources include at least two out of a grid power supply, a storage battery, and a solar cell.

9. A DC power distribution system in which a power distribution network for supplying power from a plurality of power supply sources to a plurality of electric loads is formed, the DC power distribution system comprising:

a power conversion circuit which is connected between the plurality of power supply sources and the plurality of electric loads and which supplies power corresponding to each of the electric loads; and a control power generator which supplies control power for controlling the power conversion circuit, wherein the control power generator includes a plurality of power supply circuits which are connected to the respective power supply sources and which output DC voltages, and a control device which receives detected voltages of the respective power supply sources and which supplies a DC voltage output to the power conversion circuit as the control power, the DC voltage output being of the power supply circuit corresponding to a lowest voltage among detected voltages larger than a predetermined value out of the detected voltages having been received.

10. The DC power distribution system according to claim 9, wherein the plurality of power supply sources and the plurality of electric loads are connected to each other by a DC bus electrical path.

11. The DC power distribution system according to claim 10, wherein the plurality of power supply sources include at least two out of a grid power supply, a storage battery, and a solar cell.

12. The DC power distribution system according to claim 9, wherein the plurality of power supply sources include at least two out of a grid power supply, a storage battery, and a solar cell.

13. A control power generation device which supplies control power for controlling a power conversion circuit in which a power distribution network for supplying power from a plurality of power supply sources to a plurality of electric loads is formed, the power conversion circuit being connected between the plurality of power supply sources and the plurality of electric loads and being configured to supply power corresponding to each of the electric loads, the control power generation device comprising:

a control device which receives detected voltages of the respective power supply sources and which, when the detected voltages having been received are larger than a predetermined value, sets voltage command values based on the respective detected voltages;

a plurality of power supply circuits which are connected to the respective power supply sources and which output DC voltages obtained by performing conversion according to the voltage command values; and a control power circuit which supplies, to the power conversion circuit, control power based on one of the outputs from the plurality of power supply circuits, wherein the control device sets, to a largest value, the voltage command value corresponding to a lowest voltage among the detected voltages larger than the predetermined value.

* * * * *